(12) United States Patent
Miller et al.

(10) Patent No.: US 10,182,264 B2
(45) Date of Patent: *Jan. 15, 2019

(54) METHODS AND SYSTEMS FOR SELECTING MEDIA CONTENT BASED ON A LOCATION OF A USER RELATIVE TO A VIEWING AREA

(71) Applicant: Rovi Guides, Inc., Santa Clara, CA (US)

(72) Inventors: Ashleigh Miller, Denver, CO (US); Carla Mack, Los Angeles, CA (US); Phillip Teich, Pasadena, CA (US); Mario Sanchez, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,965

(22) Filed: Sep. 30, 2015

(65) Prior Publication Data

US 2017/0094363 A1    Mar. 30, 2017

(51) Int. Cl.
| | | |
|---|---|---|
| *H04N 21/482* | (2011.01) | |
| *H04N 21/45* | (2011.01) | |
| *H04N 21/2385* | (2011.01) | |
| *H04N 21/2387* | (2011.01) | |
| *H04N 21/442* | (2011.01) | |
| *H04N 21/258* | (2011.01) | |
| *H04N 21/2668* | (2011.01) | |

(52) U.S. Cl.
CPC ..... *H04N 21/4825* (2013.01); *H04N 21/2385* (2013.01); *H04N 21/2387* (2013.01); *H04N 21/25841* (2013.01); *H04N 21/2668* (2013.01); *H04N 21/44218* (2013.01); *H04N 21/4524* (2013.01); *H04N 21/4821* (2013.01); *H04N 21/4826* (2013.01)

(58) Field of Classification Search
CPC ....... H04N 21/44218; H04N 21/25841; H04N 21/4524; H04N 1/00164; H04N 21/4825; H04W 4/02; H04W 4/28
See application file for complete search history.

(56) References Cited

U.S. PATENT DOCUMENTS

| | | | |
|---|---|---|---|
| 2009/0165049 A1* | 6/2009 | Sekiguchi | H04H 60/51 725/39 |
| 2011/0130852 A1 | 6/2011 | Thorn | |
| 2013/0111028 A1 | 5/2013 | Kondrad et al. | |
| 2014/0281971 A1 | 9/2014 | Isbell, III et al. | |
| 2015/0085875 A1 | 3/2015 | Phillips et al. | |
| 2015/0254051 A1 | 9/2015 | Panguluri et al. | |
| 2015/0256581 A1 | 9/2015 | Kolhi et al. | |

(Continued)

OTHER PUBLICATIONS

U.S. Appl. No. 14/871,039, filed Sep. 30, 2015, Ashleigh Miller, et al.

*Primary Examiner* — Jeremy S Duffield
(74) *Attorney, Agent, or Firm* — Haley Guiliano LLP

(57) ABSTRACT

Methods and systems are discussed herein for a media guidance application that aggregates content of multiple types and from multiple sources. Furthermore, the media guidance application may create a personalized presentation of this content. In such cases, the media guidance application may create a playlist in which the media assets selected for the playlist, in addition to being selected from multiple sources and/or types, are selected based on the current whereabouts of the user.

16 Claims, 10 Drawing Sheets

(56) References Cited

U.S. PATENT DOCUMENTS

2015/0345980 A1 12/2015 Subramanian et al.
2016/0044129 A1 2/2016 Bergmann et al.
2016/0246792 A1 8/2016 Anguiano

* cited by examiner

600

600 ...
601 Initialization Subroutine
602 ...
603 //Routine to calculate a length of time required for the user to reach the viewing area:
604
605 Receive instances of nodes
606 For each instance of a node:
607   A = Accessed value of a first node
608   B = Accessed value of a second node
609       If (Abs(A-B)<=tolerance)
610           Execute Subroutine to generate path using the first node
611       Else If (A<B)
612           Execute Subroutine to generate path using the second node
613       Else
614           Execute Subroutine to generate alternative routes
615 Execute Subroutine to calculate a length of time required for the user to reach the viewing area using determined route
616 ...
617 Termination Subroutine
618 ...

```
800  ...
801  Initialization Subroutine
802  ...
803  //Routine to select an action based on a determined length of time:
804
805  Receive instances of the determined length of time
806  For each instance of determined length of time:
807      Query database containing actions corresponding to lengths of time of for
         entries matching the determined length of time
808          If (Number of matching entries > 0)
809              Retrieve value of action from database entries matching the
         determined length of time
810              Execute Subroutine to using  retrieve action from database
         corresponding to determined length of time
811          Else If (Number of similar entries > 0)
812              Execute Subroutine to determined whether determined length of
         time is within threshold
813          Else
814              Execute Subroutine to recalculate the determined length of time
815  Execute Subroutine to select action
816  ...
817  Termination Subroutine
818  ...
```

FIG. 8

METHODS AND SYSTEMS FOR SELECTING MEDIA CONTENT BASED ON A LOCATION OF A USER RELATIVE TO A VIEWING AREA

BACKGROUND

Due to the availability of digital video recorders ("DVRs"), users are increasingly able to consume media outside the bounds of normal broadcast schedules. For example, users may pause or rewind live television, leaving them free to perform other activities without worrying about whether or not they will miss a portion of a program. Moreover, users are increasingly having access to Over-The-Top ("OTT") that can be accessed on demand from one or more sources. Despite all of this content available to users, there is little opportunity for users to access these multiple types of content from a single platform.

SUMMARY

Accordingly, methods and systems are discussed herein for a media guidance application that aggregates content of multiple types and from multiple sources. Furthermore, the media guidance application may create a personalized presentation of this content. In such cases, the media guidance application may create a playlist in which the media assets selected for the playlist, in addition to being selected from multiple sources and/or types, are selected based on the current whereabouts of the user.

For example, the media guidance application may select a particular playback operation based on the likelihood a user can travel to a viewing area (e.g., based on distance, speed, mode of travel, trajectory, route, traffic conditions, or scheduling limitations, etc.) from the current position of the user. For example, if the user is ten feet from a viewing area, the media guidance application may generate a playlist with broadcast media assets without performing any playback operations (e.g., because the user will be able to quickly access the viewing area of the media assets). If the user is two miles from the viewing area, the media guidance application may buffer a broadcast media asset (e.g., because the user will be able to access the viewing area after a momentary delay). Finally, if the user is ten miles away, the media guidance application may record the broadcast media asset (e.g., because the user will not be able to access the viewing location of the media asset).

In another example, the media guidance application may determine what media assets and/or what media asset types (e.g., broadcast, on demand, recorded, etc.) should be included in a playlist based on the likelihood a user can reach a viewing area. For example, if the user is ten feet from a viewing area of the playlist, the media guidance application may populate the playlist with broadcasts (e.g., because the user is likely to be able to access the viewing area during the broadcast); if the user is two miles from the viewing area, the media guidance application populates the playlist with buffered broadcasts (e.g., because the user is likely to be able to reach the viewing area, but may miss a few minutes). If the user is ten miles away from the viewing area, the media guidance application may only populate the playlist with recorded or on demand media assets (e.g., because the user is unlikely to be able to reach the viewing area until after a scheduled broadcast.

In some aspects, a media guidance application may automatically select content for playlists. The media guidance application may receive a user request to generate a playlist of media assets for presentation on a display device, wherein the display device is associated with a viewing area. For example, the media guidance application may receive a user request to generate a playlist of media assets based on one or more user-specified criteria (e.g., user preferences, genre, etc.). Furthermore, the media guidance application may associate a playlist with a particular device that will present the media assets on the playlist. For example, the media guidance application may receive a user input designating a particular device for presenting the media assets, or the media guidance application may retrieve a designated device from a user profile.

The media guidance application may detect a location of a user relative to the viewing area. For example, the media guidance application may use a global positioning system ("GPS") or other technique for obtaining coordinates of a user, or a device (e.g., a smartphone) carried by a user.

The media guidance application may calculate a length of time required for the user to reach the viewing area by creating a graphical representation of an area between the location and the viewing area, associating a first point in the graphical representation with a first node and a second point in the graphical representation with a second node, and determining a path from the location to the viewing area through either the first node or the second node based on an amount of time required to travel the path through either the first node or the second node. For example, the media guidance application may determine a path between two vertices (or nodes) in a graph (e.g., the area) such that the sum of the weights of its constituent edges is minimized.

For example, the media guidance application may employ the Dijkstra algorithm to determine the shortest path between two locations (e.g., the viewing area and the location of the user). For example, the media guidance application may determine a path from the location to the viewing area through either the first node or the second node based on an amount of time required to travel the path through either the first node or the second node. In such cases, the media guidance application may determine a first distance from the location to the first node, determine a second distance from the location to the second node, and compare the first distance to the second distance to determine whether the first distance is shorter than the second distance.

The media guidance application may then determine the length of time based on the path. For example, the media guidance application may determine the length of time required for the user to travel the shortest path between the viewing area and the location of the user. In some embodiments, the media guidance application may further factor in the mode of transportation, the current trajectory, traffic conditions, etc.

The media guidance application may then select a type of media asset (e.g., a broadcast media asset, an on demand media asset, or a recorded media asset) for inclusion in the playlist based on the length of time from a plurality of types based on the length of time. For example, the media guidance application may input the length of time into a database listing a particular length of time that corresponds to each of a plurality of media asset types to select the type. In some embodiments, the media guidance application may compare the length of time to a threshold length of time and select the type in response to determining that the length of time corresponds to the threshold length of time.

In some aspects, the media guidance application may automatically perform playback operations on media assets. The media guidance application may receive a user request to generate a playlist of media assets for presentation on a display device, wherein the display device is associated with a viewing area. For example, the media guidance application may receive a user request to generate a playlist of media assets based on one or more user-specified criteria (e.g., user preferences, genre, etc.). Furthermore, the media guidance application may associate a playlist with a particular device that will present the media assets on the playlist. For example, the media guidance application may receive a user input designating a particular device for presenting the media assets, or the media guidance application may retrieve a designated device from a user profile.

The media guidance application may detect a location of a user relative to the viewing area. For example, the media guidance application may use a global positioning system or other technique for obtaining coordinates of a user, or a device (e.g., a smartphone) carried by a user.

The media guidance application may calculate a length of time required for the user to reach the viewing area by creating a graphical representation of an area between the location and the viewing area, associating a first point in the graphical representation with a first node and a second point in the graphical representation with a second node, and determining a path from the location to the viewing area through either the first node or the second node based on an amount of time required to travel the path through either the first node or the second node. For example, the media guidance application may determine a path between two vertices (or nodes) in a graph (e.g., the area) such that the sum of the weights of its constituent edges is minimized.

For example, the media guidance application may employ the Dijkstra algorithm to determine the shortest path between two locations (e.g., the viewing area and the location of the user). For example, the media guidance application may determine a path from the location to the viewing area through either the first node or the second node based on an amount of time required to travel the path through either the first node or the second node. In such cases, the media guidance application may determine a first distance from the location to the first node, determine a second distance from the location to the second node, and compare the first distance to the second distance to determine whether the first distance is shorter than the second distance.

The media guidance application may then determine the length of time based on the path. For example, the media guidance application may determine the length of time required for the user to travel the shortest path between the viewing area and the location of the user. In some embodiments, the media guidance application may further factor in the mode of transportation, the current trajectory, traffic conditions, etc.

The media guidance application may then determine whether to perform a playback operation on a media asset (e.g., playing back, buffering, or recording the media asset) in the playlist based on the length of time. For example, the media guidance application may select the playback operation to perform from a plurality of playback operations based on the length of time. For example, the media guidance application may input the length of time into a database listing a particular length of time that corresponds to each of a plurality of playback operations to select the playback operation. In some embodiments, the media guidance application may compare the length of time to a threshold length of time and perform the playback operation in response to determining that the length of time corresponds to the threshold length of time.

It should be noted that the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode for a process for calculating a length of time required for the user to reach the viewing area in accordance with some embodiments of the disclosure;

FIG. 8 is pseudocode for a process for determining an action to be performed based on a length of time in accordance with some embodiments of the disclosure;

DETAILED DESCRIPTION OF THE DRAWINGS

Figure 1:
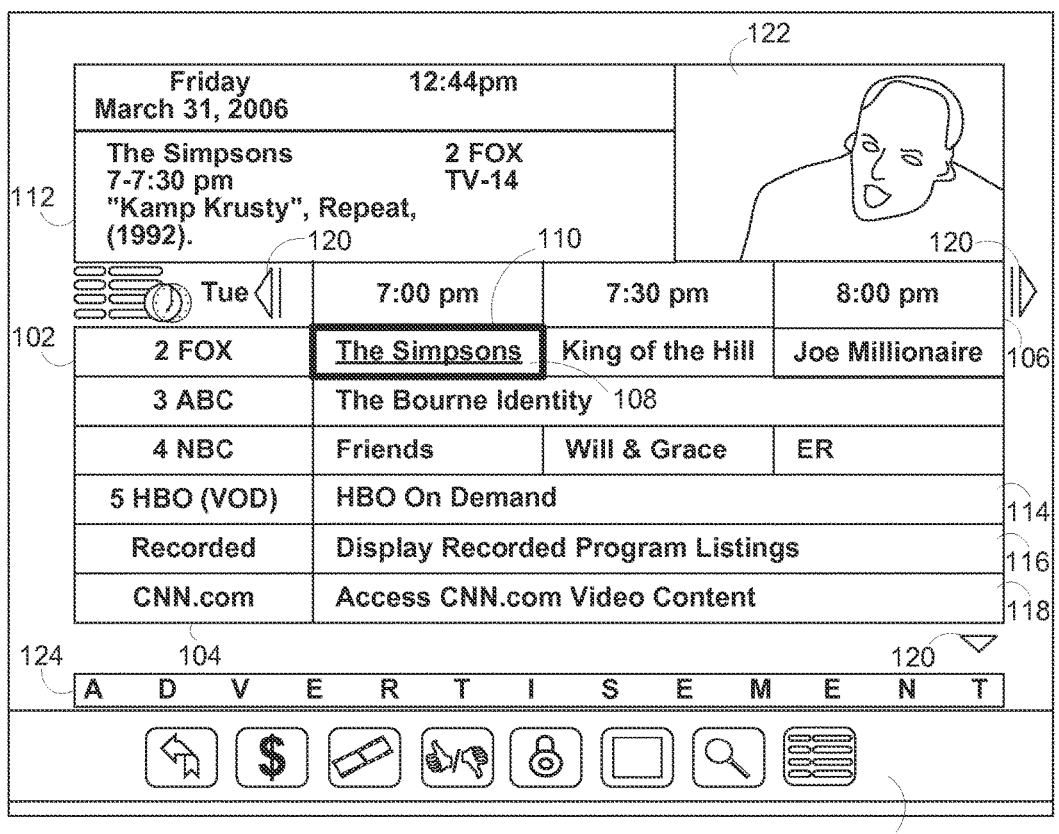
FIG. 1 shows an illustrative example of a media guidance display for navigating and selecting media assets in accordance with some embodiments of the disclosure.

Methods and systems are discussed herein for a media guidance application that aggregates content of multiple types and from multiple sources. Furthermore, the media guidance application may create a personalized presentation of this content. In such cases, the media guidance application may create a playlist in which the media assets selected for the playlist, in addition to being selected from multiple sources and/or types, are selected based on the current whereabouts of the user.

For example, the media guidance application may select a particular playback operation based on the likelihood a user can travel to a viewing area (e.g., based on distance, speed, mode of travel, trajectory, route, traffic conditions, or scheduling limitations, etc.) from the current position of the user. For example, if the user is ten feet from a viewing area, the media guidance application may generate a playlist with broadcast media assets without performing any playback operations (e.g., because the user will be able to quickly access the viewing area of the media assets). If the user is two miles from the viewing area, the media guidance application may buffer a broadcast media asset (e.g., because the user will be able to access the viewing area after a momentary delay). Finally, if the user is ten miles away, the media guidance application may record the broadcast media asset (e.g., because the user will not be able to access the viewing location of the media asset). Accordingly, the media guidance application may customize the playlist of media assets based on the location of a user.

In another example, the media guidance application may determine what media assets and/or what media asset types (e.g., broadcast, on demand, recorded, etc.) should be included in a playlist based on the likelihood a user can reach a viewing area. For example, if the user is ten feet from a viewing area of the playlist, the media guidance application may populate the playlist with broadcasts (e.g., because the user is likely to be able to access the viewing area during the broadcast); if the user is two miles from the viewing area, the media guidance application populates the playlist with buffered broadcasts (e.g., because the user is likely to be able to reach the viewing area, but may miss a few minutes). If the user is ten miles away from the viewing area, the media guidance application may only populate the playlist with recorded or on demand media assets (e.g., because the user is unlikely to be able to reach the viewing area until after a scheduled broadcast.

As used herein, "a media guidance application," "interactive media guidance application," or "guidance application" refer to a form of media guidance through an interface that allows users to efficiently navigate, identify, view, playback, and/or obtain information about content that they may desire. Furthermore, the media guidance application may incorporate or have access to one or more components that receive information indicating whether or not a user has entered or exited a viewing area, in addition to other factors associated with the viewing area, in order to select a playback operation, if any, to perform.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

It should be noted that throughout this disclosure, embodiments may discuss performing one or more actions with regard to a playlist. For example, embodiments may discuss selecting a type of media content for a playlist, may discuss selecting a playback operation for a media asset in a playlist, etc. It should be noted that any embodiment related to performing one action may be applied to any other action. Likewise, any embodiment describing populating a playlist with media asset may also be applied to updating, reordering, adding to, and/or any other alteration or generation of a playlist and/or a media asset in a playlist.

It should be noted that embodiments described herein may be performed in relation to one or more users. For example, the media guidance application may perform a particular action based on the length of time required for a user to access a viewing area from a current location. Such embodiments may also be applied to multiple users. For example, the media guidance application may perform different actions to different playlists based on determined lengths of time for different users. Alternatively or additionally, the media guidance application may perform different actions to the same playlist based on the determined lengths of time for the different users. For example, the media guidance application may determine a length of time required for all users in a user group to reach the same (or a respective) viewing area. The determined length of time may then be used to determine a type of media content used to populate one or more playlists, selection playback operations, etc.

In some embodiments, the media guidance application may generate for display a media asset on a display of a user device, in which the user device is associated with a viewing area. For example, the media guidance application may generate for display a program on a television located within a particular room. In such a case, the particular room may constitute the viewing area.

As used herein, a "viewing area" refers to the maximum distance from a user device, in all directions, in which a user could feasibly consume a media asset present on the user device. For example, if the user device is a television, the viewing area may refer to the maximum distance from the television at which the average user can understand the content presented. In some embodiments, the viewing area may correspond to a perceivable range. Various systems and methods for detecting whether or not a user is within a range are discussed in, for example, Shimy, U.S. Patent Application Publication No. 2011/0069940, published May 24, 2011, which is hereby incorporated by reference herein in its entirety.

In some cases, the size of a viewing area is a function of the obstacles surrounding the user device. For example, if a personal computer resides in a small room with walls that prevent a user on an opposite side of the walls from understanding content presented on the personal computer, then the viewing area of the personal computer corresponds to the area within the walls. Alternatively, if one of the walls were removed, such that a user, formerly opposite of the removed wall from the personal computer, can now understand the content presented on the personal computer, the viewing area associated with the personal computer has now expanded in the direction of the removed wall.

In some cases, the size of a viewing area is a function of the objects surrounding the user device. For example, if a television resides in a room with other devices, the audio output of which prevent a user a particular distance away from the television from hearing content presented on the television, then the viewing area of the television corresponds to the maximum distance away from the television that the user can hear content presented on the television due to the audio output of the other devices. Alternatively, if one of the other devices were removed, such that a user that could not previously hear content presented on the television can now hear the content presented on the television, the viewing area associated with the television has now expanded due to the removal of the other device.

In some embodiments, the viewing area associated with a user device may correspond to the predetermined proximity to the user device. Alternatively, the predetermined proximity may refer to another area, which may or may not be associated with geographical boundaries and/or distances. For example, the predetermined proximity may refer to a finite measurement of distance from a user device.

In another example, the predetermined proximity may refer to an area at which user devices may connect with a network (e.g., a home network), not necessarily the distance or other relationship of a user to the user device. For example, to determine whether or not a user is within a viewing area, the media guidance application may base its determination on whether or not the user device can connect to a home network. For example, a user device such as a smartphone may be carried by a user from a viewing area (e.g., an area where the user device can receive and consequently present a media asset) to an area outside the viewing area (e.g., an area where the user device cannot receive or present the media asset).

In another example, to determine whether or not a user device is within a viewing area of a user device, the media guidance application may base its determination on data received from a global positioning system (e.g., indicating that the user is within a particular geographical boundary and/or distance). In yet another example, to determine whether or not a user is within a predetermined proximity to a user device, the media guidance application may base its determination on whether or not a user input is received indicating that the first user is within the viewing area.

Figure 3:
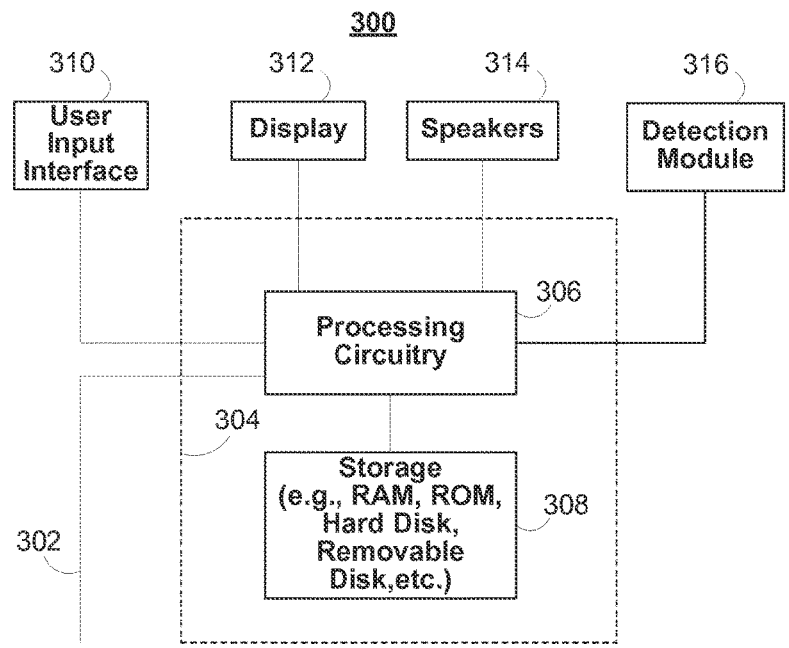
FIG. 3 is a block diagram of an illustrative user equipment device in accordance with some embodiments of the disclosure.

In some embodiments, the media guidance application may detect that a user is in (or is not in) the viewing area. For example, a detection module incorporated into or accessible by the media guidance application may monitor the viewing area to determine if and when a user is within or outside the viewing area. The media guidance application may employ numerous techniques for determining when a user enters or exits a viewing area as discussed in relation to detection module 316 (FIG. 3).

The media guidance application may also determine a location of a user. As used herein, "location" refers to any relative or absolute identifier of a position of a user. For example, the location of the user may be relative to a geographical coordinate, vector for direction, street address, name of building, or any other suitable identifier. In another example, the location may be relative to a property type (e.g., restaurant, hardware store, movie theatre, postoffice, personal residence, place of business, etc.).

In some embodiments, a user device, upon which the media guidance application is implemented, may use GPS data (e.g., received from a GPS device incorporated into or accessible by the media guidance application that identifies the current geographic coordinates), object-recognition data (e.g., received from an object-recognition module incorporated into or accessible by the media guidance application that identifies an object associated with a particular location), or other data to determine the current location of the user.

The media guidance application may then determine whether to perform a playback operation on the media asset based on the determined length of time. For example, the media guidance application may select a playback operation to perform, if any, from a plurality of playback operations based on the determined length of time.

It should be noted that locations may in some embodiments be associated with buffer times. For example, the media guidance application may interface with a mobile device at a first location with one buffer time while the mobile device applies a different buffer time at a second location. For example, despite a user entering a viewing area (e.g., a room, a home network, etc.), the media guidance application may apply an additional amount of time in order for the user to turn on equipment, sit down, etc. The buffer time may be customized to each location and/or the display device at a particular location. For example, the media guidance application may associated a mobile device may at a first location with a different buffer time than a television at the first location. Likewise, the media guidance application may associated a mobile device may at a first location with a different buffer time than the same mobile device at a second location.

As referred to herein, a "playback operation" refers to any media guidance application operation that relates to playing back a media asset. In some embodiments, the media guidance application may perform a fast-access playback operation. As referred to herein, the phrase "fast-access playback operations" should be understood to mean any playback operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter, or any other operation that does not play back the media asset at normal playback speed. The fast-access playback operation may be any playback operation that is not "play," where the play operation plays back the media asset at normal playback speed.

It should also be noted that embodiments described herein relating to the performance of a playback operation may also relate to the performance of any media guidance application operation. For example, the media guidance application may select any media guidance application to perform based on the determined length of time. As referred to herein, a "media guidance application operation" refers to any operation corresponding to providing, receiving, and generating media guidance data and/or media assets for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user.

The media guidance application may then select a type of media asset (e.g., a broadcast media asset, an on demand media asset, or a recorded media asset) for inclusion in the playlist based on the length of time from a plurality of types based on the length of time. For example, the media guidance application may input the length of time into a database listing a particular length of time that corresponds to each of a plurality of media asset types to select the type. In some embodiments, the media guidance application may compare the length of time to a threshold length of time and select the type in response to determining that the length of time corresponds to the threshold length of time.

As referred to herein, a "type" refers to any category of media asset that is distinguishable from any other category of media asset. For example, a type of media asset may refer to a category of media assets that is distinguishable from other media assets based on the way that it is communicated to a user (e.g., communicated as a broadcast, a recording, or an on demand program).

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may determine what playback operation, if any, to perform based on comparing the determined length of time to a threshold length of time. As used herein, a "threshold length of time" is an amount of time that results in a predetermined action being performed. In some embodiments, the media guidance application may have numerous threshold lengths of time. For example, one threshold length of time may correspond to a first playback operation and a second threshold of time may correspond to a second playback operation. The media guidance application may compare the determined length of time to one or more of these thresholds. If the determined length of time corresponds to the first threshold length of time, the media guidance application performs the first playback operation, and/or if the determined length of time corresponds to the second threshold length of time, the media guidance application performs the second playback operation.

The media guidance application may then compare the length of time associated with the portion to a threshold length of time. Instead of selecting a playback operation based on the total length of the determined length of time, the media guidance application may select a playback operation based on the portion of the determined length of time that included the particular content (e.g., an advertisement). Alternatively, the media guidance application may subtract the amount of time constituting the portion from the total determined length of time to arrive at an amount of time of the determined length of time that did not include the particular content.

Figure 2:
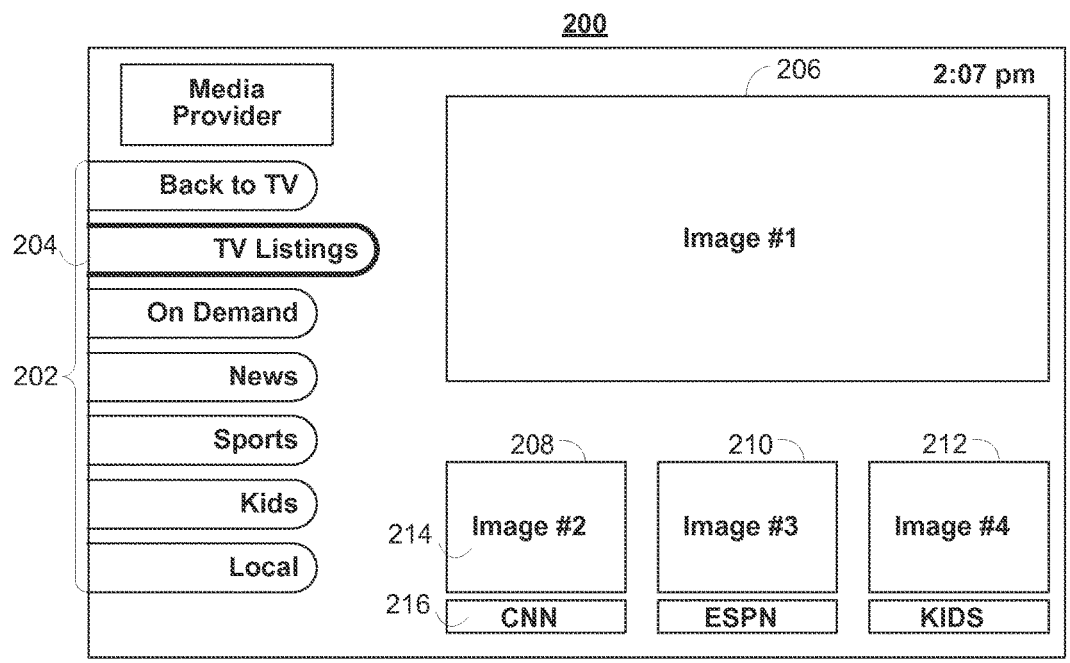
FIG. 2 shows another illustrative example of a media guidance display for navigating and selecting media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, I I I et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, I/O path 302 may include multiple connections and/or multiple types of connections. These connections may act in parallel and/or in series. Furthermore, control circuitry 304 may adjust a playlist and/or any action taken with regard to the playlist to account for the number and/or type of connection at any time. For example, the media guidance application may select a type of media asset, playback operation, etc. based on a current connection type (or a type of connection available to a user in viewing area). However, if the viewing area of the user and/or the connection at a viewing area of a user changes, control circuitry 304 may select a different type of media asset, playback operation, etc. Accordingly, the circumstances of the I/O path 302 may constitute an additional factor (e.g., as discussed below in relation to FIG. 9) upon which the media guidance application determines an action to undertake with respect to the playlist.

Furthermore, control circuitry 304 may select different I/O paths and/or establish additional connections as the viewing area of the user changes. For example, if the viewing area of the user moves from one location to another (e.g., the viewing area is associated with a mobile display device, a different viewing area and/or display device is selected by a user, etc.), control circuitry 304 control circuitry 304 may select a different type of media asset, playback operation, etc. In some embodiments, control circuitry 304 may recommend and/or provide indications of particular viewing areas, the I/O paths, and/or the effects on the playlist (e.g., media content available at those viewing areas) to a user.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. For example, detection module 316 may identify particular users and/or the movements of the particular user. For example, via detection module 316, the media guidance application may determine when a user enters and/or exits a viewing area associated with a media asset and/or a display device. Detection module 316 may further include various components (e.g., a video detection component, an audio detection component, etc.). In some embodiments, detection module 316 may include components that are specialized to generate particular information (e.g., engagement indicia).

In some embodiments, detection module 316 may include a content recognition module to determine a location of a user. The content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique. For example, the media guidance application may receive data in the form of a video of the viewing area. The video may include a series of frames. For each frame of the video, the media guidance application may use a content recognition module or algorithm to determine a person that is currently located within (or not currently located within) a viewing area.

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine a location of a user.

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be location information. Furthermore, the data could contain values (e.g., the data could be expressed in binary or any other suitable code or programming language).

As used herein, "location information" refers to any information used by the user or by a device associated with the user to establish a location of a user or viewing location. For example, location information may include geographic coordinates, a mailing address, an e-mail address, a web-site address, a telephone number, an IP address, etc., associated with an entity.

Furthermore, in some embodiments, location information may appear as information that does not necessarily describe an address, location, or other option for contacting a user. For example, a user device associated with a user may generate for display only a name of an entity (e.g., a business name, nickname, landmark, etc.). In such cases, the name of the entity may be considered the location information.

In some embodiments, the location information may be associated with a mobile user device. For example, the media guidance application may detect a mobile user device (or the use of a mobile device) used by or otherwise associated with a user, and determine the location information based on that user device.

In some embodiments, detection module 316 may include a Global Positioning System ("GPS") detection component, which determines or receives information describing the geographic position of a user. For example, the GPS detection component may, additionally or alternatively, determine whether or not the user is taking a particular path (e.g., whether or not the current position of a user corresponds to a position in the path), is on schedule (e.g., whether or not the current position of a user corresponds to the position the user is scheduled to be at in the path based on the current time), or the current travelling speed of the user. In some embodiments, the GPS detection component includes one or more sensors that transmit data to processing circuitry 306, which determines a change and/or update to a user's travel itinerary, a user status, and/or objective.

In some embodiments, detection module 316 may include an Internet access component, which determines or receives information describing the current trip retrieved over the Internet. For example, the Internet access component may, additionally or alternatively, determine whether or not information on the Internet (e.g., traffic updates, weather updates, etc.) indicates a change or update to the length of time required for a user to access a viewing area. Additionally or alternatively, detection module 316 may include a vehicle access component, which determines or receives information (e.g., from the odometer of a car) describing the current trip retrieved from the vehicle. For example, the media guidance application may be configured to receive information from the flight control system of an airplane, car, or other vehicle. Likewise, the media guidance application may access data from another device (e.g., a smartphone) carried by a user that indicates the current location of the user. In some embodiments, the Internet access component, vehicle access component, or device access component may transmit data to processing circuitry 306, which determines a change and/or update to a user's location.

For example, detection module 316 may access and/or receive commands from systems and/or data associated with the method or mode of transportation. For example, detection module 316 may receive specific inputs from the media control system associated with the method or mode of transportation (e.g., an airline IFE system). Furthermore, the media guidance application may incorporate information and/or commands. For example, during a flight, detection module 316 may incorporate pilot/flight attendant announcements, flight/navigation equipment signals, and/or data collected on previous flights to adjust a media playlist.

The media guidance application may also receive (e.g., via detection module 316 (FIG. 3)) user-generated data (e.g., status updates, microblog posts, etc.) describing a location of a user. For example, if a user posts an update to a social media website that he/she is currently at a particular location, the media guidance application may determine the user is at the location.

For example, the media guidance application may retrieve a list of entities such as friends (e.g., a social network buddy list), contacts (e.g., retrieved from a phone/text message/e-mail account associated with the user), and/or public services (e.g., hospitals, police departments, schools, etc.) with known associations to the user or the community of the user and parse content received by and/or distributed by these accounts for information related to the location of a user. For example, the media guidance application may retrieve a contacts list for the user and parse data related to that contacts list. As referred to herein, a "contacts list" refers to any collection of names of entities associated with a user. In some embodiments, the contacts list used may be a contacts list associated with a particular account.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
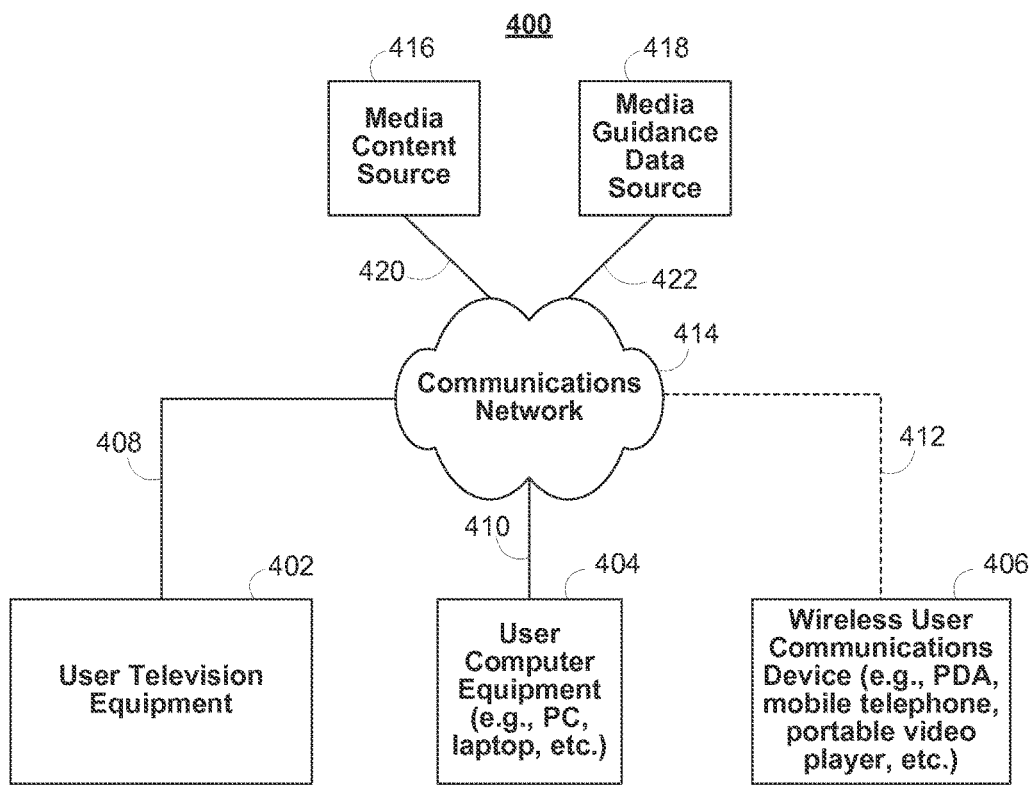
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device.

In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

In some embodiments, content source 416 may include multiple content sources. These content sources may act in parallel and/or in series. Furthermore, control circuitry 304 may adjust a playlist and/or any action taken with regard to the playlist to account for the number and/or type of content source available at any time. For example, the media guidance application may select a type of media asset, playback operation, etc. based on the content sources currently available to a particular viewing area). However, if the viewing area of the user and/or the content sources available at that viewing area changes, control circuitry 304 may select a different type of media asset, playback operation, etc. Accordingly, as the media guidance application may continuously update the playlist based on the content sources that are currently available, the content sources currently available to a user at a viewing area may constitute an additional factor as described below in relation to FIG. 9.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
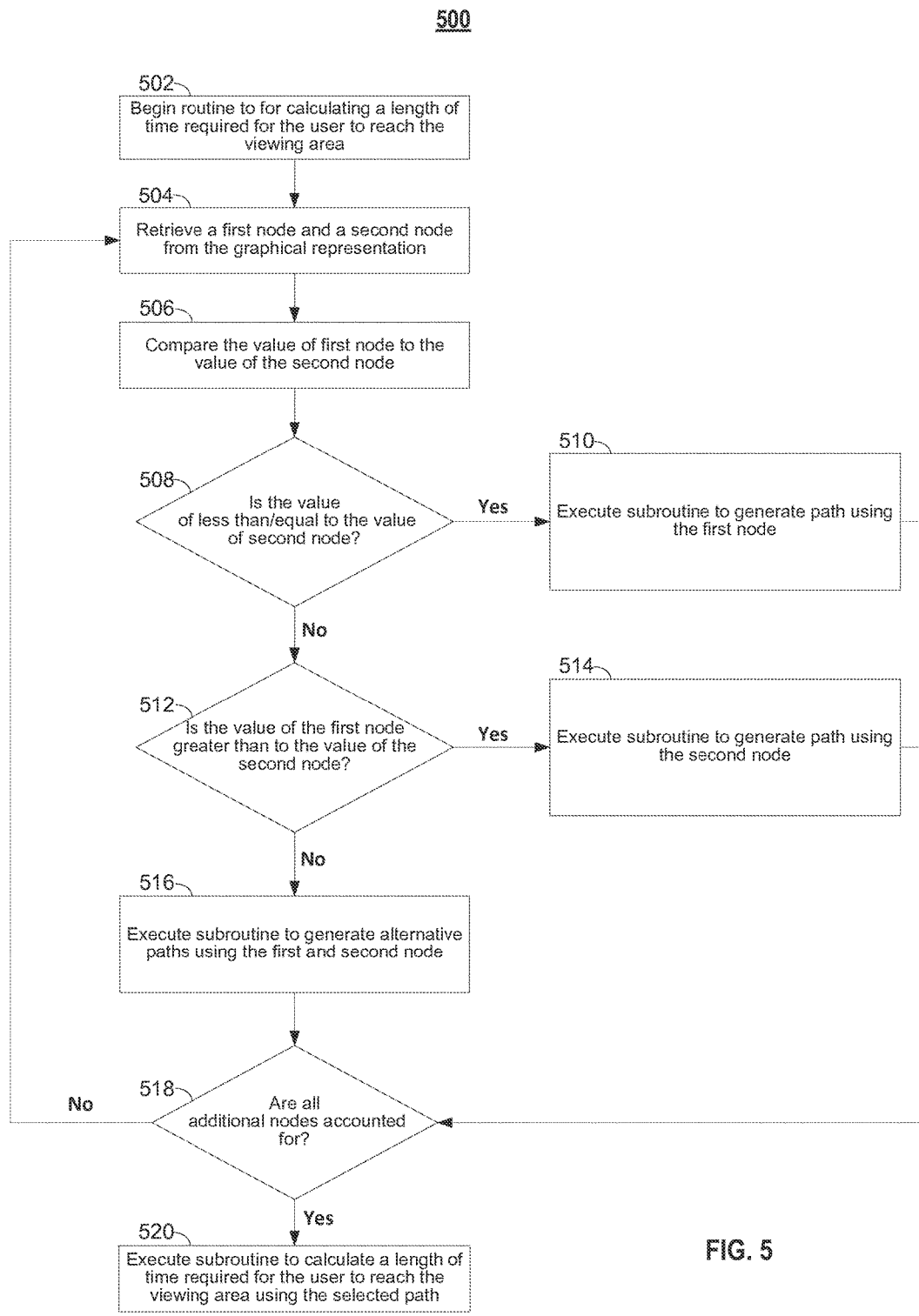
FIG. 5 is a flow chart of a process for calculating a length of time required for the user to reach the viewing area in accordance with some embodiments of the disclosure.

FIGS. 5 and 6 present processes for control circuitry (e.g., control circuitry 304) for calculating a length of time required for the user to reach the viewing area in accordance with some embodiments of the disclosure. In some embodiments this algorithm may be encoded on to a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

It should be noted that the steps or descriptions of FIGS. 5-6 may be used with any other embodiment of this disclosure. In addition, the steps and descriptions described in relation to FIGS. 5-6 may be done in alternative orders or in parallel to further the purposes of this disclosure. For example, each of these steps may be performed in any order or in parallel or substantially simultaneously to reduce lag or increase the speed of the system or method. Moreover, each of these steps may be performed in one or more iterations. For example, the media guidance application may perform process 500 one or more times in order to determine multiple lengths of times. For example, the multiple lengths of time may correspond to different routes and/or other additional factors (e.g., as described below in relation to FIG. 9) that may affect a length of time. Additionally or alternatively, the media guidance application may perform process 500 one or more time in order to update a determined length of time (e.g., in order to account for circumstantial changes such as traffic accident, weather changes, etc.). For example, such changes may cause the media guidance application to continually re-calculate a length of time and/or make cascading changes to a playlist. Furthermore, it should be noted that any of the devices or equipment discussed in relation to FIGS. 3-4 could be used to perform one or more of the steps in FIGS. 5-6.

The flow chart in FIG. 5 describes a process implemented on control circuitry (e.g., control circuitry 304) for calculating a length of time required for the user to reach the viewing area in accordance with some embodiments of the disclosure.

At step 502, control circuitry 304 implements a process for calculating a length of time required for the user to reach the viewing area. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his or her input using a display (e.g., by generating a prompt to be displayed on display 312) prior to running the algorithm.

For example, the media guidance application may calculate a length of time required for the user to reach the viewing area by creating a graphical representation of an area between the location and the viewing area, associating a first point in the graphical representation with a first node and a second point in the graphical representation with a second node, and determining a path from the location to the viewing area through either the first node or the second node based on an amount of time required to travel the path through either the first node or the second node. For example, the media guidance application may determine a path between two vertices (or nodes) in a graph (e.g., the area) such that the sum of the weights of its constituent edges is minimized.

For example, the media guidance application may employ the Dijkstra algorithm (or otherwise solve a shortest path problem) to determine the shortest path between two locations (e.g., the viewing area and the location of the user). For example, the media guidance application may determine a path from the location to the viewing area through either the first node or the second node based on an amount of time required to travel the path through either the first node or the second node. In such cases, the media guidance application may determine a first distance from the location to the first node, determine a second distance from the location to the second node, and compare the first distance to the second distance to determine whether the first distance is shorter than the second distance.

For example, in the case of the path corresponding to a series of roads, the problem of finding the shortest path between two intersections (e.g., a node) on a road map (e.g., the graphical representation of the area), the intersections (e.g., nodes) and the edges correspond to road segments, each weighted by the length of its road segment).

The media guidance application may then determine the length of time based on the path. For example, the media guidance application may determine the length of time required for the user to travel the shortest path between the viewing area and the location of the user. In some embodiments, the media guidance application may further factor in the mode of transportation, the current trajectory, traffic conditions, etc.

At step 504, control circuitry 304 proceeds to retrieve a first node and a second from the graphical representation. In some embodiments control circuitry 304 may receive a single primitive data structure that represents the value of a point (e.g., an intersection on a path from the location of the user to the viewing area). In some embodiments the value may be stored as part of a larger data structure, and control circuitry 304 may retrieve the value by executing appropriate accessor methods to retrieve the value from the larger data structure. Furthermore, each node may be weighted based on the distance between the nodes (e.g., the distance between the location of the user and the node), the speed at which the user may travel the distance, the traffic conditions associated with travelling the distance, and/or any other factor that may impact an amount of time corresponding to the node.

At step 506, control circuitry 304 proceeds to compare the value of the first node to the second node. In some embodiments the value of the nodes may also be retrieved for each and every iteration, and the value of the nodes may change from iteration to iteration. In some embodiments, control circuitry 304 may directly compare the value of the first node with the value of the second node by accessing the values respectively from memory and performing a value comparison. In some instances, control circuitry 304 may call a comparison function (e.g., for object-to-object comparison) to compare the first node and second node.

At step 508, control circuitry 304 compares the values of the first node and the second node to determine if the value of the first node is less than the value of the second node. If the condition is satisfied, process 500 proceeds to step 510; if the condition is not satisfied, process 500 proceeds to step 512 instead.

At step 510, control circuitry 304 executes a subroutine to generate a path using the first node based on the condition at step 508 being satisfied. After the subroutine is executed, process 500 proceeds to step 518 where it is determined if all additional nodes are accounted for and whether or not further iterations are needed. For example, the media guidance application may perform multiple iterations of process 500 to determine a length of time associated with every combination of nodes from the location of the user to the viewing area.

At step 512, control circuitry 304 compares the values of the first node and second nodes to determine if the value of first node is greater than the value of second node. If the condition is satisfied, process 500 proceeds to step 514; if the condition is not satisfied, process 500 proceeds to step 516 instead.

At step 514, control circuitry 304 executes a subroutine to generate a path using the second node based on the condition of step 512 being satisfied. After the subroutine is executed, process 500 proceeds to step 518 where it is determined if all additional nodes are accounted for and if further iterations are needed.

At step 516, control circuitry 304 executes a subroutine to generate alternative paths for the first node and the second node based on both of the conditions in 508 and 512 not being satisfied. For example, the media guidance application may generate multiple paths and wait to determine which one to select based on subsequent iterations of process 500. After the subroutine is executed, process 500 proceeds to 518 where it is determined if all additional nodes are accounted for and whether or not further iterations are needed. For example, the media guidance application may perform multiple iterations of process 500 to determine a length of time associated with every combination of nodes from the location of the user to the viewing area.

At step 518, control circuitry 304 checks if all additional nodes are accounted for. If all of the additional nodes have been evaluated, control circuitry 304 may proceed to step 520. For example, control circuitry 304 may call a function to see if there is a next element of a node. If the function returns true (i.e., there are still nodes that need to be processed), control circuitry 304 proceeds to step 504.

At step 520, control circuitry 304 executes a subroutine to calculate a length of time required for the user to reach the viewing area using the selected nodes. For example, after multiple iterations of process 500, in which each iteration determines the best path from a first node to a second node, the first node to a third node, etc., the media guidance application selects the best path and calculates the length of time required for the user to reach the viewing area using the selected path (e.g., by retrieving speed of travel, traffic conditions, etc.) associated with the path.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several nodes may be evaluated in parallel, using multiple logical processor threads, or the algorithm may be enhanced by incorporating branch prediction. Furthermore, it should be noted that the process of FIG. 5 may be implemented on a combination of appropriately configured software and hardware, and that any of the devices or equipment discussed in relation to FIGS. 3-4 could be used to implement one or more portions of the process.

The pseudocode in FIG. 6 describes a process to calculate a length of time required for the user to reach the viewing area in accordance with some embodiments of the disclosure. It will be evident to one skilled in the art that the process described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 runs a subroutine to initialize variables and prepare to calculate a length of time required for the user to reach the viewing area, which begins on line 605. For example, in some embodiments control circuitry 304 may copy instructions from a non-transitory storage medium (e.g., storage device 308) into RAM or into the cache for processing circuitry 306 during the initialization stage. Additionally, in some embodiments the value of the node being used for comparison, or a tolerance level for determining if two values are essentially equivalent, may be retrieved, set, and stored at 601.

At line 605, control circuitry 304 receives instances of the nodes. In some embodiments these instances may be retrieved from memory. Control circuitry 304 may receive instances of the nodes by receiving, for example, a pointer to an array of values of the nodes. In another example, control circuitry 304 may receive an object of a class, such as an iterator object containing elements of the nodes.

At line 606, control circuitry 304 iterates through the various instances of nodes; if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 stores the value of a first node into a temporary variable "A." In some embodiments the value of the first node will be stored as part of a larger data structure or class, and the value of the first node may be obtained through appropriate accessor methods. In some embodiments the first node may be converted from a string or other non-numeric data type into a numeric data type by means of an appropriate hashing algorithm. In some embodiments, control circuitry 304 may call a function to perform a comparison of a first node to a second node. In some embodiments the first node may be encoded as a primitive data structure, and rather than using a temporary variable, the first node may be directly used in the comparisons at lines 609 and 611.

At line 608, control circuitry 304 stores the value of the second node into a temporary variable "B." Similar to the first node, in some embodiments the value of second node will be stored as part of a larger data structure or class, and the value of the second node may be obtained through accessor methods. In some embodiments the second node may be converted from a string or other non-numeric data type into a numeric data type by means of an appropriate hashing algorithm, or the second node may be a primitive data structure, and may be directly used in the comparisons at lines 609 and 611.

At line 609, control circuitry 304 compares the value of A to the value of B to see if they are essentially equivalent. This is achieved by subtracting the value of B from A, taking the absolute value of the difference, and then comparing the absolute value of the difference to a predetermined tolerance level. In some embodiments the tolerance level may be a set percentage of either A or B. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero, or the condition inside the IF statement may be replaced with a strict equivalence between A and B.

At line 610, control circuitry 304 executes a subroutine to generate a path using the first node if the condition in line 609 is satisfied. In some embodiments this may be achieved by processing circuitry 306, sending the appropriate signals to control circuitry 304.

At line 611, control circuitry 304 compares the value of A and B to determine if A is less than B. In some embodiments this comparison will only be done if A is not essentially equivalent to B and the comparison in line 609 evaluates to FALSE.

At line 612, control circuitry 304 executes a subroutine to generate a path using the second node if the condition in line 611 is satisfied.

At line 613, control circuitry 304 determines whether neither condition in lines 609 or 611 is satisfied. If neither condition is satisfied, then the instruction at line 614 may be evaluated and executed.

At line 614, control circuitry 304 executes a subroutine to generate alternative paths if neither of the conditions at lines 609 or 611 is satisfied.

At line 616, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 600 described by the pseudocode in FIG. 6 may be implemented in any number of programming languages and a variety of different hardware, as well as the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch. In some embodiments, rather than iterating over all nodes at step 506, in some embodiments the code may be rewritten so control circuitry 304 is instructed to evaluate multiple nodes simultaneously on a plurality of processors or processor threads, lowering the number of iterations needed and potentially speeding up computation time.

Figure 7:
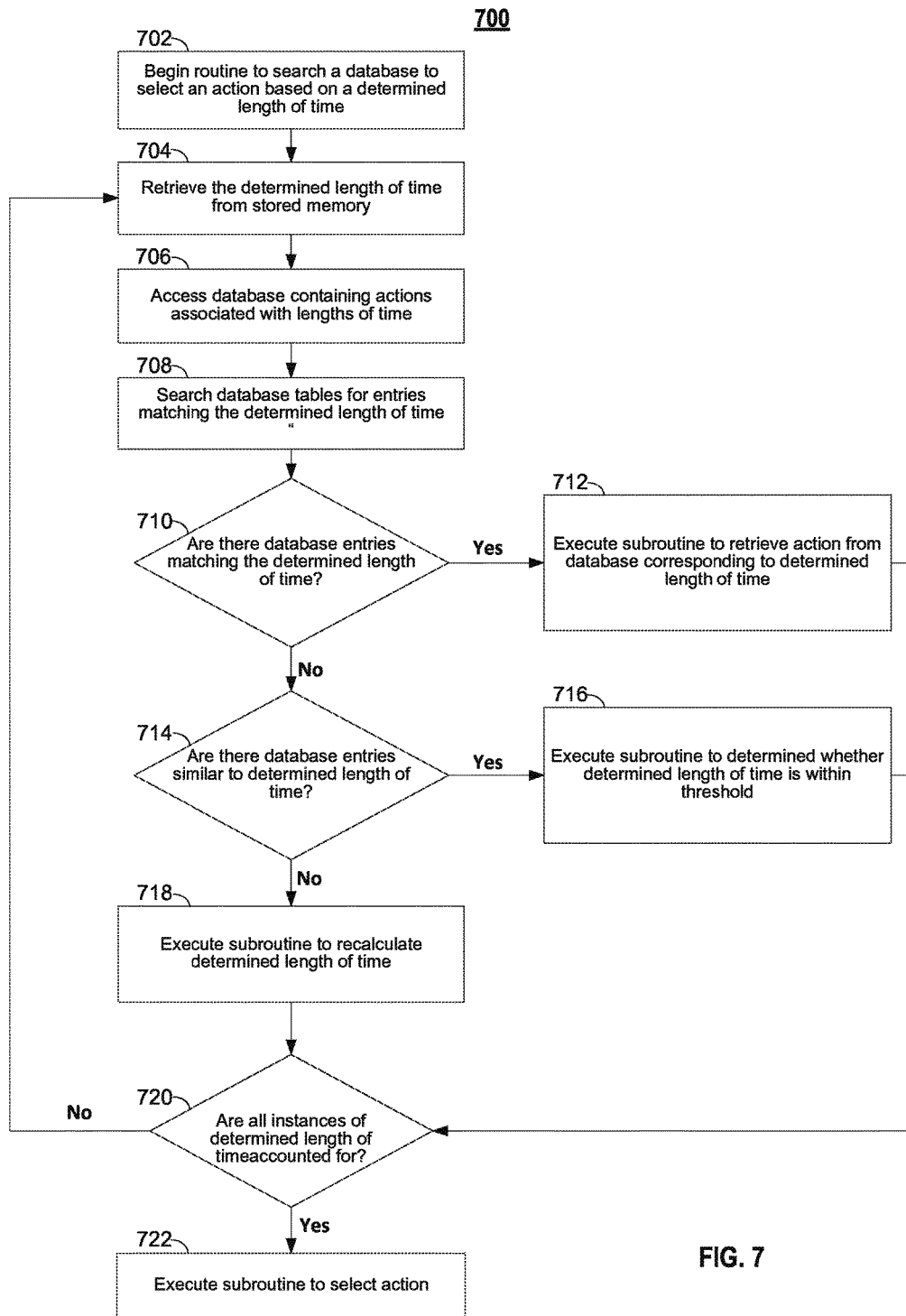
FIG. 7 is a flow chart of a process for determining an action to be performed based on a length of time in accordance with some embodiments of the disclosure.

FIGS. 7 and 8 present processes implemented on control circuitry (e.g., control circuitry 304) to search a database to select an action based on a determined length of time in accordance with some embodiments of the disclosure. Similar to the algorithms described by FIGS. 5 and 6, in some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

It should be noted that the steps or descriptions of FIGS. 7-8 may be used with any other embodiment of this disclosure. In addition, the steps and descriptions described in relation to FIGS. 7-8 may be done in alternative orders or in parallel to further the purposes of this disclosure. For example, each of these steps may be performed in any order or in parallel or substantially simultaneously to reduce lag or increase the speed of the system or method. Moreover, each of these steps may be performed in one or more iterations. For example, the media guidance application may perform process 700 one or more times in order to determine different actions based on a determined length of time and/or different actions based on different lengths of times. Additionally or alternatively, the media guidance application may perform process 700 one or more time in order to update the action in order to account for circumstantial changes such as traffic accident, weather changes, etc.) that may affect a determined length of time. For example, such changes may cause the media guidance application to continually recalculate a length of time and/or make cascading changes to a playlist.

The flow chart in FIG. 7 describes a process implemented on control circuitry (e.g., control circuitry 304) to search a database and select an action based on a determined length of time in accordance with some embodiments of the disclosure. For example, the media guidance application may use process 700 to determine a type of media asset and/or a playback operation associated with a determined length of time.

At step 702, control circuitry 304 implements a process to search a database and to select an action based on a determined length of time. In some embodiments, this may be done either directly or indirectly in response to a user action or input (e.g., from signals received by control circuitry 304 or user input interface 310). For example, in response to a user requesting a playlist (and/or in response to determining a length of time required for a user to access a viewing area from a location), the media guidance application may execute process 700.

At step 704, control circuitry 304 proceeds to retrieve the determined length of time from stored memory. In some embodiments control circuitry 304 may retrieve a single primitive data structure that represents the value of the determined length of time. In some embodiments control circuitry 304 may retrieve the value from a larger class or data structure.

At step 706, control circuitry 304 accesses a database containing actions (e.g., media type selections, playback operations, etc.) associated with lengths of time. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At step 708, control circuitry 304 searches database tables for entries matching the determined length of time. In some embodiments this may be done by comparing an identifier, for example, a string or integer representing determined length of times that matches the types of identifiers used inside the database. In some embodiments control circuitry 304 may submit a general query to the database for table entries matching a determined length of time, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At step 710, control circuitry 304 determines if there are database entries matching the determined length of time. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the determined length of time, the algorithm proceeds to step 712; otherwise, the algorithm proceeds to step 714.

At step 712, control circuitry 304 executes a subroutine to retrieve action from a database corresponding to a determined length of time. Afterwards, the algorithm may proceed to step 720 where it is determined if there are further determined lengths of time that need to be accounted for. For example, in some embodiments, the media guidance application may determine several potential lengths of time, each associated with a likely length of time required for a user to access a viewing area from a location. For example, each potential length of time may be associated with a particular path or combination of factors (e.g., as described in relation to FIG. 9 below).

At step 714, control circuitry 304 determines if there are database entries similar to the determined length of time. For example, in some embodiments, if the determined length of time is encoded as a string with multiple characters, control circuitry 304 may perform additional database queries for similar strings with individual characters replaced, removed or added. In some embodiments control circuitry 304 may also determine if the original query was a commonly misspelled word, and will submit a query with the correct spelling instead. In another example, the determined length of time may be encoded as an integer; control circuitry 304 may perform additional queries for other integers within a certain range. In some embodiments control circuitry 304 may retrieve database entries similar to the determined length of time without requiring further queries. If control circuitry 304 identifies that there are database entries similar to the determined length of time the algorithm proceeds to step 716; otherwise, the algorithm proceeds to step 718.

At step 716, control circuitry 304 executes a subroutine to determined whether a determined length of time is within a threshold. For example, the media guidance application may determine whether or not a determined length of time is within a particular threshold. Afterwards, the algorithm may proceed to step 720.

At step 718, control circuitry 304 executes a subroutine to recalculate a determined length of time after determining that there were no matching database entries for the determined length of time. Afterwards, the algorithm may proceed to step 720.

At step 720, control circuitry 304 determines if all instances of the determined length of time are accounted for and if further iterations are needed. If further iterations are needed, the algorithm will loop back to step 704 where control circuitry 304 will retrieve the next instance of the determined length of time. If no further iterations are needed, the algorithm will proceed to step 722.

At step 722, control circuitry 304 executes a subroutine to select an action (e.g., a type of media asset and/or a particular playback operation) as output by the database.

It is contemplated that the descriptions of FIG. 7 may be used with any other embodiment of this disclosure. In addition, the descriptions described in relation to process 700 of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of process 700. As a further example, although step 712 and step 716 are described as being mutually exclusive, both exact entries and similar entries may be processed for a single instance of the determined length of time. To further this purpose, in some embodiments, step 710 and step 714 may be performed in parallel by control circuitry 304. Furthermore, it should be noted that the process of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes a process to select an action based on a determined length of time in accordance with some embodiments of the disclosure. It will be evident to one skilled in the art that process 800, described by the pseudocode in FIG. 8, may be implemented in any number of programming languages and a variety of different hardware, and that the style and format should not be construed as limiting, but rather a general template of the steps and procedures that would be consistent with code used to implement some embodiments of this disclosure.

At line 801, control circuitry 304 runs a subroutine to initialize variables and prepare to select an action based on a determined length of time, which begins on line 805. For example, in some embodiments, control circuitry 304 may copy instructions from non-transitory storage medium (e.g., storage device 308) into RAM or into the cache for processing circuitry 306 during the initialization stage.

At line 805, control circuitry 304 receives instances of the determined length of time. In some embodiments, these instances may be retrieved from memory.

At line 806, control circuitry 304 iterates through the various instances of the determined length of time; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments, it may be convenient to store the instances of the determined length of time in a single class or encapsulated data structure that will perform the loop as part of an internal method.

At line 807, control circuitry 304 queries a database for entries matching the determined length of time. Depending on how the database is implemented and how the determined length of time is stored, an intermittent step may be required to convert the determined length of time into a form consistent with the database. For example, the determined length of time may encoded into a string or an integer using an appropriate hashing algorithm prior to being transmitted to the database by control circuitry 304 as part of a query. In some embodiments, the determined length of time may be encoded as a primitive data structure, and control circuitry 304 may submit the determined length of time as a query to the database directly. After querying the database, control circuitry 304 may receive a set of database entries matching the determined length of time. In some embodiments control circuitry 304 may receive these entries in the form of a data-structure, a set of indices of the database, or a set of indices of another cross-referenced database.

At line 808, control circuitry 304 will determine if there are any database entries matching the determined length of time. In some embodiments, control circuitry 304 may determine this by checking if the database returned an empty data structure or a NULL value in response to the query in line 807. If there are matching database entries, the algorithm may proceed to line 809. If there were no matching database entries, the algorithm may instead proceed to line 812.

At line 809, control circuitry 304 retrieves one or more values of an action from the database entries matching the determined length of time. For example, if control circuitry 304 retrieves a list of indices after querying the database in line 807, in some embodiments, control circuitry 304 may retrieve the database entries for the action located at the received indices. In some embodiments, the indices may point to a larger data structure contained within the database, and control circuitry 304 may retrieve the values of the action from within the data structure using appropriate accessor methods. In some embodiments, control circuitry 304 may retrieve the values of the action and store them in a separate data structure locally (e.g., in storage 308) prior to proceeding further. After retrieving the values of the action, the algorithm will proceed to line 810.

At line 810, control circuitry 304 executes a subroutine to use the values of the determined length of time and retrieve an action from a database corresponding to a determined length of time using control circuitry 304. Afterwards, the algorithm may proceed to line 815.

At line 811, control circuitry 304 determines if there are any database entries similar to the determined length of time. For example, [Variable C] may be represented by an object of a class. Control circuitry 304 may call a function to perform a fuzzy comparison (e.g., a comparison to identify similar objects of the class) by comparing specific fields of the class or by performing approximate string matching on data related to the determined length of time. If database entries similar to the determined length of time are found by control circuitry 304, then the algorithm proceeds to line 812. If control circuitry 304 does not find matching entries (e.g., a query to the database returns a NULL value), the algorithm proceeds to line 812.

At line 812, control circuitry 304 executes a subroutine to determine whether determined a length of time is within the threshold using control circuitry. Afterwards, the algorithm may proceed to line 815.

At line 811, control circuitry 304 determines that there were no database entries matching the determined length of time. In this case, the algorithm will proceed to line 812.

At line 812, control circuitry 304 executes a subroutine to determined whether determined length of time is within threshold using control circuitry 304. Afterwards, the algorithm may proceed to line 814.

At line 814, control circuitry 304 executes a subroutine to recalculate the determined length of time if neither of the conditions at lines 609 or 611 are satisfied.

At line 815, control circuitry 304 executes a subroutine to select the action outputted by the database using control circuitry 304. Afterwards, the algorithm may proceed to the termination subroutine at line 817.

At line 817, control circuitry 304 executes a termination subroutine after the algorithm has performed its function and all instances of the determined length of time have been processed and checked against the database. For example, in some embodiments, control circuitry 304 may destruct variables, perform garbage collection, free memory or clear the cache of processing circuitry 306.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments, the code may be re-written so control circuitry 304 is instructed to evaluate multiple instances of the determined length of time and submit multiple database queries simultaneously using a plurality of processors or processor threads. It is also understood that, although we may describe control circuitry 304 interacting with a single database, this is only a single embodiment described for illustrative purposes, and the algorithm of FIG. 8. may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 9:
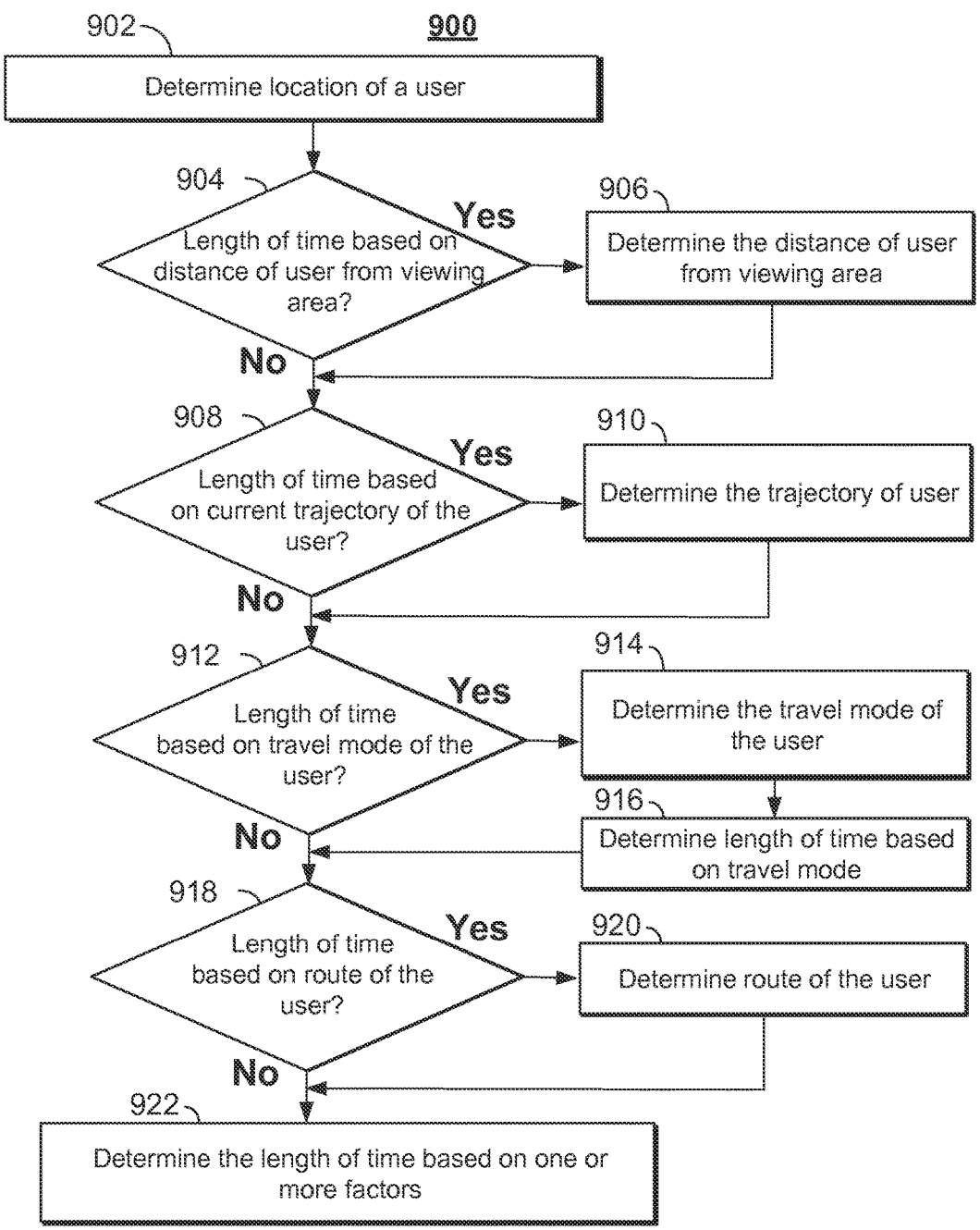
FIG. 9 is a flow chart of illustrative steps for calculating a length of time based on factors other than, or in addition to, a length of time in accordance with some embodiments of the disclosure.

FIG. 9 is a flow chart of illustrative steps for calculating a length of time based on factors other than, or in addition to, a length of time. It should be noted that process 900, or any step thereof, could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to calculate a length of time. In addition, one or more steps of process 900 may be incorporated into or combined with one or more steps of any other process or embodiment (e.g., as described in FIGS. 5-8 and 10-11).

At step 902, the media guidance application determines (e.g., via control circuitry 304 (FIG. 3)) a location of a user. For example, in some embodiments, step 902 may receive (e.g., via I/O path 302 (FIG. 3)) data indicating that a user is currently located at particular coordinates. For example, before determining the length of time required for a user to reach a viewing area, the media guidance application first determines a location of a user.

At step 904, the media guidance application determines (e.g., via control circuitry 304 (FIG. 3)) whether or not the length of time required for a user to reach the viewing area is based on the distance between the location and the viewing area. For example, the media guidance application may determine (e.g., via process 500 (FIG. 5)) the shortest distance between the location and the viewing area If the media guidance application determines (e.g., via control circuitry 304 (FIG. 3)) the length of time based on the distance, the media guidance application proceeds to step 906 and determines the distance before proceeding to step 908. If the media guidance application determines (e.g., via control circuitry 304 (FIG. 3)) not to base the length of time on the distance, the media guidance application proceeds directly to step 908.

At step 908, the media guidance application determines (e.g., via control circuitry 304 (FIG. 3)) whether or not to base the length of time on the current trajectory of the user. For example, the media guidance application may determine that the user is currently traveling towards (or away) from the viewing area.

If the media guidance application determines (e.g., via control circuitry 304 (FIG. 3)) to base the length of time on the current trajectory, the media guidance application proceeds to step 910 and determines the current trajectory (e.g., via information recorded by detection module 316 (FIG. 3)) before proceeding to step 912. If the media guidance application determines (e.g., via control circuitry 304 (FIG. 3)) not to base the length of time on the current trajectory, the media guidance application proceeds directly to step 912.

At step 912, the media guidance application determines (e.g., via control circuitry 304 (FIG. 3)) whether or not the length of time is based on the mode of transportation. For example, the media guidance application may determine (e.g., via detection module 316 (FIG. 3)) whether or not the user is traveling in a vehicle, walking, etc.

If the media guidance application determines (e.g., via control circuitry 304 (FIG. 3)) to base the length of time on the mode of transportation, the media guidance application proceeds to step 914 and determines the mode of transportation (e.g., via information recorded by detection module 316 (FIG. 3)) before proceeding to step 916 and determining the length of time based on the mode of transportation. For example, the media guidance application may determine (e.g., via control circuitry 304 (FIG. 3)) that a first mode of transportation (e.g., a car) takes less time than a second mode of transportation (e.g., walking).

If the media guidance application determines (e.g., via control circuitry 304 (FIG. 3)) not to base the length of time on the mode of transportation, the media guidance application proceeds directly to step 918.

At step 918, the media guidance application determines (e.g., via control circuitry 304 (FIG. 3)) whether or not to base the length of time on a path taken by the user. For example, the media guidance application may determine (e.g., via detection module 316 (FIG. 3)) the movements and/or actions of the user. For example, if several paths from the location to the viewing area are available, the media guidance application may determine which path is being taken by the user and base the length of time on that path.

If the media guidance application determines (e.g., via control circuitry 304 (FIG. 3)) to base the length of time on the path, the media guidance application proceeds to step 920 and determines the path before proceeding to step 922. If the media guidance application determines (e.g., via control circuitry 304 (FIG. 3)) not to base the length of time on the path, the media guidance application proceeds directly to step 922.

At step 922, the media guidance application determines (e.g., via control circuitry 304 (FIG. 3)) the length of time required for a user to reached the viewing area from the location based on the one or more factors. For example, the media guidance application accounts for the determinations made in steps 906, 910, 916, and 920, and determines the length of time based on these determinations.

For example, the media guidance application determines (e.g., via control circuitry 304 (FIG. 3)) the length of time based on one or more of the determinations made in steps 906, 910, 916, and 920, as well as other factors (e.g., weather conditions, traffic conditions, etc.)

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
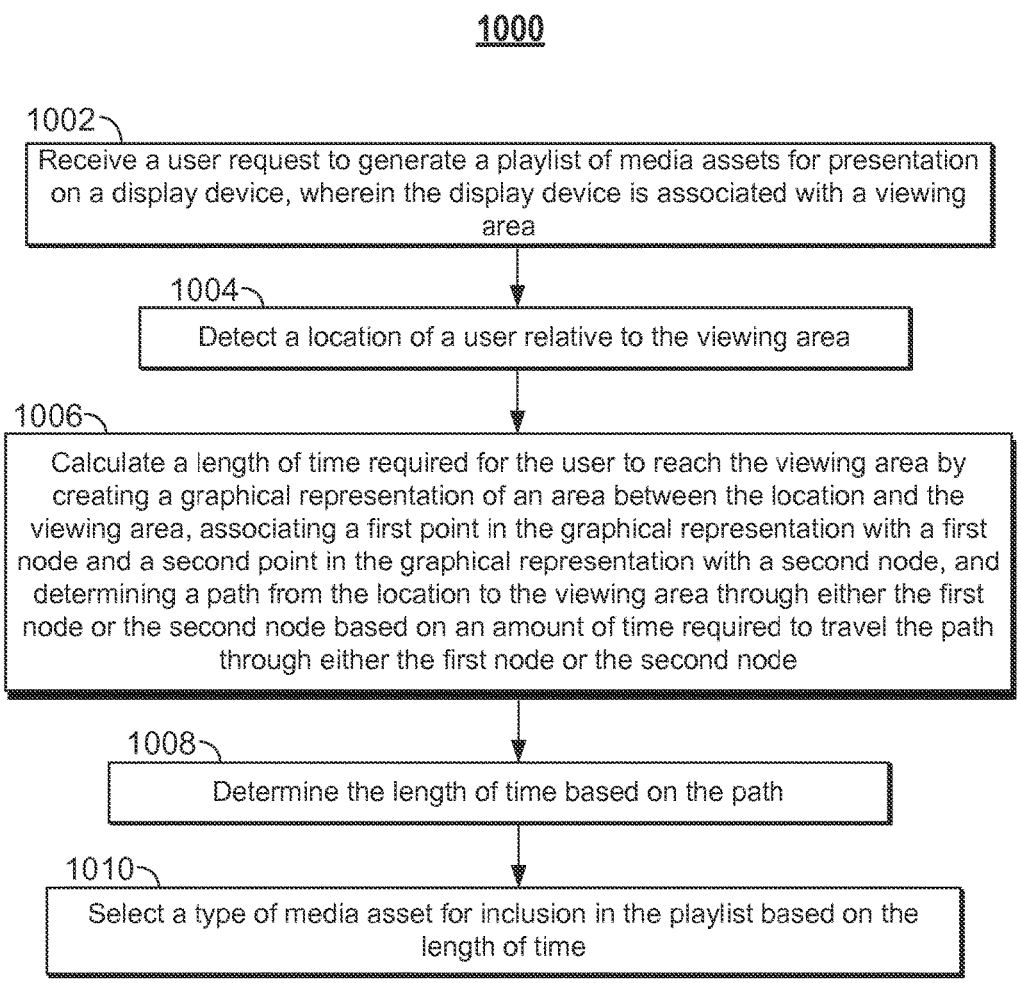
FIG. 10 is a flow chart of illustrative steps for selecting a type of media asset for inclusion in the playlist based on the length of time in accordance with some embodiments of the disclosure.

FIG. 10 is a flow chart of illustrative steps for selecting a type of media asset for inclusion in the playlist based on the length of time. It should be noted that process 1000, or any step thereof, could be performed on, or provided by, any of the devices shown in FIGS. 3-4. For example, process 1000 may be executed by control circuitry 304 (FIG. 3) as instructed by a media guidance application implemented on a user device (e.g., user equipment devices 402, 404, and/or 406 (FIG. 4)) in order to select a type of media asset for inclusion in the playlist based on the length of time. In addition, one or more steps of process 1000 may be incorporated into or combined with one or more steps of any other process or embodiment (e.g., as described in FIGS. 5-9 and 11).

At step 1002, the media guidance application receives a user request (e.g., via user input interface 310 (FIG. 3)) to generate (e.g., via control circuitry 304 (FIG. 3)) a playlist of media assets for presentation on a display device (e.g., user equipment device 402, 404, and/or 40 (FIG. 4)), wherein the display device is associated with a viewing area. For example, the media guidance application may receive a user request to generate a playlist of media assets based on one or more user specified criteria (e.g., user preferences, genre, etc.). Furthermore, the media guidance application may associate a playlist with a particular device that will present the media assets on the playlist. For example, the media guidance application may receive a user input designation a particular device for presenting the media assets, of the media guidance application may retrieve a designated device from a user profile.

At step 1004, the media guidance application detects (e.g., via control circuitry 304 (FIG. 3)) a location of a user relative to the viewing area. For example, the media guidance application may use a global positioning system ("GPS") or other technique for obtaining coordinates of a user, or a device (e.g., a smartphone) carried by a user.

At step 1006, the media guidance application calculates (e.g., via control circuitry 304 (FIG. 3)) a length of time required for the user to reach the viewing area by creating a graphical representation of an area between the location and the viewing area, associating a first point in the graphical representation with a first node and a second point in the graphical representation with a second node, and determining a path from the location to the viewing area through either the first node or the second node based on an amount of time required to travel the path through either the first node or the second node. For example, the media guidance application may determine the path between two vertices (or nodes) in a graph (e.g., the area) such that the sum of the weights of its constituent edges is minimized.

For example, the media guidance application may employ the Dijkstra algorithm to determine the shortest path between two locations (e.g., the viewing area and the location of the user). For example, the media guidance application may determine (e.g., via control circuitry 304 (FIG. 3)) a path from the location to the viewing area through either the first node or the second node based on an amount of time required to travel the path through either the first node or the second node. In such cases, the media guidance application may determine a first distance from the location to the first node, determine a second distance from the location to the second node, and compare the first distance to the second distance to determine whether the first distance is shorter than the second distance.

In some embodiments, the media guidance application may determine a length of time based on prior determinations. For example, the media guidance application may retrieve previous determinations for one or more "saved locations" from a user profile. For example, the media guidance application may store an average length of time required for a user to access a viewing area from the workplace of the user. To determine the length of time, the media guidance application may retrieve this average length of time from memory (e.g., storage 308 (FIG. 3)).

At step 1008, the media guidance application determines (e.g., via control circuitry 304 (FIG. 3)) the length of time based on the path. For example, the media guidance application may determine the length of time required for the user to travel the shortest path between the viewing area and the location of the user. In some embodiments, the media guidance application may further factor in the mode of transportation, the current trajectory, traffic conditions, etc. as discussed above in relation to FIG. 9.

At step 1010, the media guidance application selects (e.g., via control circuitry 304 (FIG. 3)) a type of media asset (e.g., a broadcast media asset, an on-demand media asset, or a recorded media asset) for inclusion in the playlist based on the length of time from a plurality of types based on the length of time. For example, the media guidance application may input the length of time into a database listing a particular length of time that corresponds to each of a plurality of media asset types to select the type. In some embodiments, the media guidance application may compare the length of time to a threshold length of time and select the type in response to determining that the length of time corresponds to the threshold length of time.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
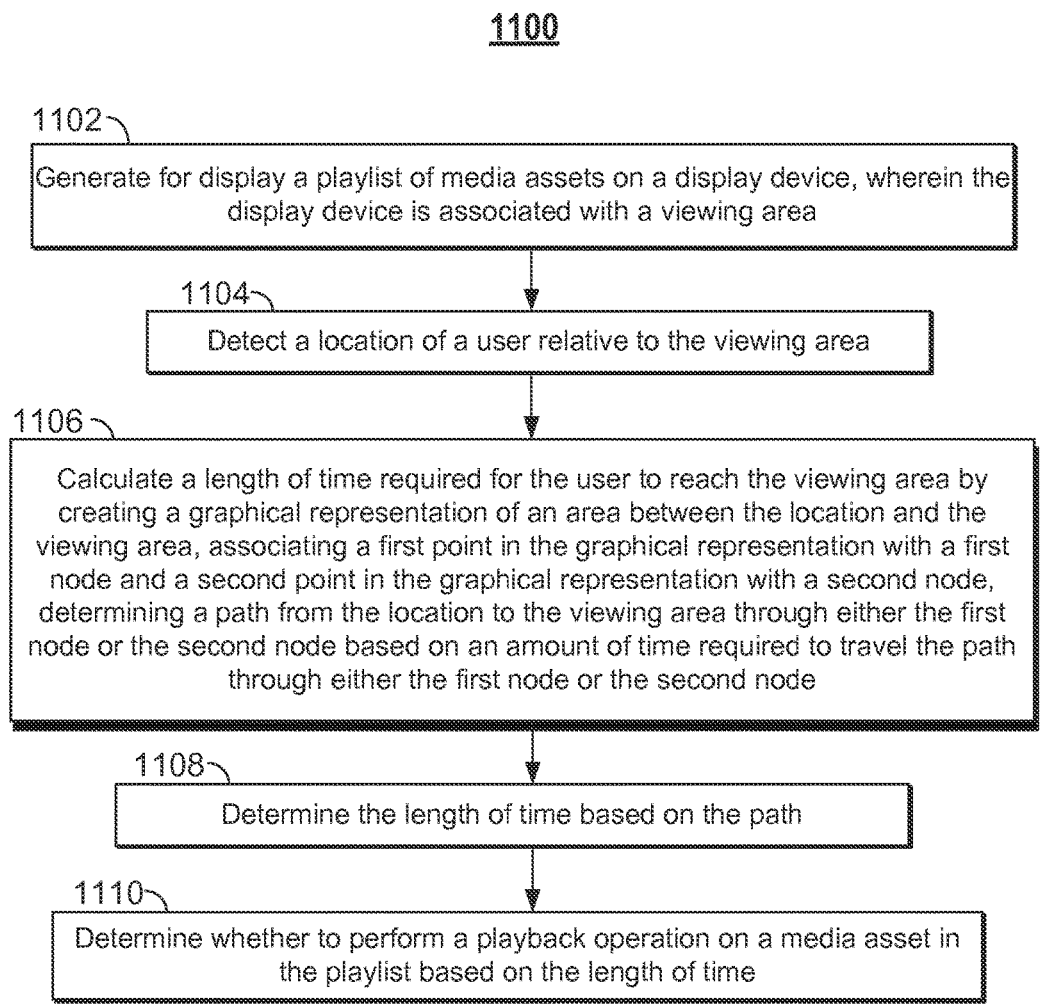
FIG. 11 is a flow chart of illustrative steps for determining whether to perform a playback operation on a media asset in the playlist based on the length of time in accordance with some embodiments of the disclosure.

FIG. 11 is a flow chart of illustrative steps for determining whether to perform a playback operation on a media asset in the playlist based on the length of time. It should be noted that process 1100 or any step thereof could be performed on, or provided by, any of the devices shown in FIGS. 3-4. For example, process 1100 may be executed by control circuitry 304 (FIG. 3) as instructed by a media guidance application implemented on a user device (e.g., user equipment devices 402, 404, and/or 406 (FIG. 4)) in order to determine whether to perform a playback operation on a media asset in the playlist based on the length of time. In addition, one or more steps of process 1100 may be incorporated into, or combined with, one or more steps of any other process or embodiment (e.g., as described in FIGS. 5-10).

At step 1102, the media guidance application receives a user request (e.g., via user input interface 310 (FIG. 3)) to generate (e.g., via control circuitry 304 (FIG. 3)) a playlist of media assets for presentation on a display device, wherein the display device is associated with a viewing area. For example, the media guidance application may receive a user request to generate a playlist of media assets based on one or more user specified criteria (e.g., user preferences, genre, etc.). Furthermore, the media guidance application may associate a playlist with a particular device that will present the media assets on the playlist. For example, the media guidance application may receive a user input designation, a particular device for presenting the media assets, or the media guidance application may retrieve a designated device from a user profile.

At step 1104, the media guidance application detects (e.g., via control circuitry 304 (FIG. 3)) a location of a user relative to the viewing area. For example, the media guidance application may use a global positioning system or other technique for obtaining coordinates of a user, or a device (e.g., a smartphone) carried by a user.

At step 1106, the media guidance application calculates (e.g., via control circuitry 304 (FIG. 3)) a length of time required for the user to reach the viewing area by creating a graphical representation of an area between the location and the viewing area, associating a first point in the graphical representation with a first node and a second point in the graphical representation with a second node, and determining a path from the location to the viewing area through either the first node or the second node based on an amount of time required to travel the path through either the first node or the second node. For example, the media guidance application may determine the path between two vertices (or nodes) in a graph (e.g., the area) such that the sum of the weights of its constituent edges is minimized.

For example, the media guidance application may employ the Dijkstra algorithm to determine the shortest path between two locations (e.g., the viewing area and the location of the user). For example, the media guidance application may determine a path from the location to the viewing area through either the first node or the second node based on an amount of time required to travel the path through either the first node or the second node. In such cases, the media guidance application may determine a first distance from the location to the first node, determine a second distance from the location to the second node, and compare the first distance to the second distance to determine whether the first distance is shorter than the second distance.

In some embodiments, the media guidance application may determine a length of time based on prior determinations. For example, the media guidance application may retrieve previous determinations for one or more "saved locations" from a user profile. For example, the media guidance application may store an average length of time required for a user to access a viewing area from a specified location (such as a workplace, home, or other defined location). To determine the length of time, the media guidance application may retrieve this average length of time from memory (e.g., storage 308 (FIG. 3)).

At step 1108, the media guidance application determines (e.g., via control circuitry 304 (FIG. 3)) the length of time based on the path. For example, the media guidance application may determine the length of time required for the user to travel the shortest path between the viewing area and the location of the user. In some embodiments, the media guidance application may further factor in the mode of transportation, the current trajectory, traffic conditions, etc. as discussed in relation to FIG. 9.

At step 1110, the media guidance application determines (e.g., via control circuitry 304 (FIG. 3)) whether to perform a playback operation on a media asset (e.g., playing back, buffering, or recording the media asset) in the playlist based on the length of time. For example, the media guidance application may select the playback operation to perform from a plurality of playback operations based on the length of time. For example, the media guidance application may input the length of time into a database listing a particular length of time that corresponds to each of plurality of playback operations to select the playback operation. In some embodiments, the media guidance application may compare the length of time to a threshold length of time and perform the playback operation in response to determining that the length of time corresponds to the threshold length of time.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flow charts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for automatically selecting between broadcast and recorded content for inclusion in playlists based on current whereabouts of users, the method comprising:
   receiving a user request to generate a playlist of media assets for presentation on a display device, wherein the display device is positioned within a viewing area;
   detecting a location of a user relative to the viewing area within which the display device is positioned and presents the playlist;
   determining that the location of the user is away from the viewing area within which the display device is positioned;
   calculating a length of time required for the user to reach the viewing area by:
      creating a graphical representation of an area between the location and the viewing area;

associating a first point in the graphical representation with a first node and a second point in the graphical representation with a second node; and determining a path from the location to the viewing area through either the first node or the second node based on an amount of time required to travel the path through either the first node or the second node;

determining the length of time based on the path;

comparing the length of time to a threshold length of time;

based on determining that the length of time is less than or equal to the threshold length of time, selecting a broadcast media asset for inclusion in the playlist presented by the display device positioned within the viewing area; and based on determining that the length of time is greater than the threshold length of time, selecting a recorded media asset for inclusion in the playlist presented by the display device positioned within the viewing area.

2. The method of claim 1, further comprising inputting the length of time into a database listing a particular length of time that corresponds to each of a plurality of types of media asset to select a type of media asset for inclusion on the playlist.

3. The method of claim 1, further comprising determining the path based on a mode of transportation of the user.

4. The method of claim 1, further comprising determining the path based on a current trajectory of the user.

5. The method of claim 1, further comprising determining the length of time based on a speed of the user along the path.

6. The method of claim 1, further comprising determining the length of time based on current traffic conditions along the path.

7. The method of claim 2, wherein the plurality of types includes a broadcast media asset, an on demand media asset, and a recorded media asset.

8. The method of claim 1, wherein determining the path from the location to the viewing area through either the first node or the second node based on the amount of time required to travel the path through either the first node or the second node, comprises:

determining a first distance from the location to the first node;

determining a second distance from the location to the second node; and comparing the first distance to the second distance to determine whether the first distance is shorter than the second distance.

9. A system for automatically selecting between broadcast and recorded content for inclusion in playlists based on current whereabouts of users, the system comprising:

storage circuitry that stores a playlist of media assets; and control circuitry that:

receives a user request to generate a playlist of media assets for presentation on a display device, wherein the display device is positioned within a viewing area;

detects a location of a user relative to the viewing area within which the display device is positioned and presents the playlist;

determines that the location of the user is away from the viewing area within which the display device is positioned;

calculates a length of time required for the user to reach the viewing area by:

creating a graphical representation of an area between the location and the viewing area;

associating a first point in the graphical representation with a first node and a second point in the graphical representation with a second node; and determining a path from the location to the viewing area through either the first node or the second node based on an amount of time required to travel the path through either the first node or the second node;

determines the length of time based on the path;

compares the length of time to a threshold length of time;

based on determining that the length of time is less than or equal to the threshold length of time, selects a broadcast media asset for inclusion in the playlist presented by the display device positioned within the viewing area; and based on determining that the length of time is greater than the threshold length of time, selects a recorded media asset for inclusion in the playlist presented by the display device positioned within the viewing area.

10. The system of claim 9, wherein the control circuitry inputs the length of time into a database listing a particular length of time that corresponds to each of a plurality of types of media asset to select a type of media asset for inclusion on the playlist.

11. The system of claim 9, wherein the control circuitry determines the path based on a mode of transportation of the user.

12. The system of claim 9, wherein the control circuitry determines the path based on a current trajectory of the user.

13. The system of claim 9, wherein the control circuitry determines the length of time based on a speed of the user along the path.

14. The system of claim 9, wherein the control circuitry determines the length of time based on current traffic conditions along the path.

15. The system of claim 10, wherein the plurality of types includes a broadcast media asset, an on demand media asset, and a recorded media asset.

16. The system of claim 9, wherein the control circuitry that determines the path from the location to the viewing area through either the first node or the second node based on the amount of time required to travel the path through either the first node or the second node:

determines a first distance from the location to the first node;

determines a second distance from the location to the second node; and compares the first distance to the second distance to determine whether the first distance is shorter than the second distance.

* * * * *